US010757749B2

(12) United States Patent
Stattin et al.

(10) Patent No.: US 10,757,749 B2
(45) Date of Patent: Aug. 25, 2020

(54) METHODS, APPARATUSES AND COMPUTER READABLE MEDIA FOR OPTIMIZING RADIO RESOURCE CONTROL RRC CONNECTIVITY

(71) Applicant: TELEFONAKTIEBOLAGET LM ERICSSON (PUBL), Stockholm (SE)

(72) Inventors: Magnus Stattin, Upplands Väsby (SE); Riikka Susitaival, Helsinki (FI); Béla Rathonyi, Lomma (SE); Mark Curran, County Carlow (IE)

(73) Assignee: TELEFONAKIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/090,503

(22) PCT Filed: Mar. 31, 2017

(86) PCT No.: PCT/IB2017/051876
§ 371 (c)(1),
(2) Date: Oct. 1, 2018

(87) PCT Pub. No.: WO2017/168397
PCT Pub. Date: Oct. 5, 2017

(65) Prior Publication Data
US 2019/0124713 A1  Apr. 25, 2019

Related U.S. Application Data

(60) Provisional application No. 62/317,121, filed on Apr. 1, 2016.

(51) Int. Cl.
*H04W 4/00* (2018.01)
*H04W 76/25* (2018.01)
(Continued)

(52) U.S. Cl.
CPC .......... *H04W 76/25* (2018.02); *H04W 28/06* (2013.01); *H04W 48/16* (2013.01); *H04W 76/19* (2018.02); *H04W 76/27* (2018.02)

(58) Field of Classification Search
None
See application file for complete search history.

(56) References Cited

U.S. PATENT DOCUMENTS

| | | | |
|---|---|---|---|
| 2011/0080894 A1* | 4/2011 | Iwamura | H04W 36/0022 370/331 |
| 2014/0146759 A1 | 5/2014 | Cho et al. | |
| 2015/0141030 A1* | 5/2015 | Basu-Mallick | H04W 76/36 455/452.1 |

OTHER PUBLICATIONS

Ericsson, Improved Synchronized RRC Procedures, R2-151126, 3GPP TSG RAN WG2 #89bis, Bratislava, Slovakia, Apr. 20-24, 2015.

(Continued)

*Primary Examiner* — Zewdu A Beyen

(57) ABSTRACT

In one embodiment, a method in a wireless device for radio resource control ("RRC") connectivity includes transmitting a RRC connection request message to a network node, wherein the RRC connection request message is part of a first RRC connection protocol. The method may also include receiving a responsive message from the network node, wherein the response message is part of the first RRC connection protocol. The method may further include receiving an indication that the wireless device should suppress a RRC connection complete message that is part of the first RRC connection protocol. The method may further include determining that the RRC connection complete message should not be transmitted to the network node and suppressing the transmittal of the RRC connection complete message to the network node.

19 Claims, 7 Drawing Sheets

(51) Int. Cl.
H04W 76/19 (2018.01)
H04W 48/16 (2009.01)
H04W 76/27 (2018.01)
H04W 28/06 (2009.01)

(56) References Cited

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 13), 3GPP TS 36.331 V13.0.0, Dec. 2015.
Ericsson, RRC Connection Suspend and Resume, Tdoc R2-160475, 3GPP TSG-RAN WG2 NB-IOT Ad-hoc Meeting, Budapest, Hungary, Jan. 19-21, 2016.
Ericsson, Resume ID, Tdoc R2-161743, 3GPP TSG-RAN WG2 #93, Malta, Feb. 15-19, 2016.
3rd Generation Partnership Project; Technical Specification Group Services and System Aspects; Architecture enhancements for Cellular Internet of Things (Release 13), 3GPP TR 23.720 V1.2.0, Nov. 2015.
Ericsson, RRC Connection Suspend and Resume, Tdoc R2-156395, 3GPP TSG-RAN WG2 #92, Anaheim, USA, Nov. 16-20, 2015.

* cited by examiner

METHODS, APPARATUSES AND COMPUTER READABLE MEDIA FOR OPTIMIZING RADIO RESOURCE CONTROL RRC CONNECTIVITY

This application is a 371 of International Application No. PCT/162017/051876, filed Mar. 31, 2017, which claims the benefit of U.S. Provisional Application No. 62/317,121, filed Apr. 1, 2016, the disclosures of which are fully incorporated herein by reference.

TECHNICAL FIELD

The present disclosure relates generally to wireless communications and, more specifically, to optimizing radio resource control connectivity.

BACKGROUND

In LTE-Rel-13 and LTE-Rel-14, security aspects of radio resource control ("RRC") connectivity are discussed and standardized in 3GPP. RRC messaging may be used to perform a number of connectivity functions including RRC establishment, re-establishment, resume, and reconfiguration between a UE and an eNB. In LTE, certain security features such as integrity protection and ciphering are performed by PDCP. In UMTS, integrity protection of the Control Plane (CP) is performed by RRC itself, whereas ciphering is performed by the RLC layer. The assumption in LTE for RRC messages is that the RRC messages would be both integrity protected and ciphered unless an exception was required and acceptable.

The transmission of RRC messages may be communicated using signaling radio bearers (SRBs). There are several types of SRBs, including SRB0, SRB1, and SRB2. SRB0 is used for RRC messages using the common control channel ("CCCH"), while SRB1 and SRB2 use the dedicated control channel ("DCCH"). SRB0 typically does not include integrity protection or ciphering, while signaling messages over SRB1 typically include both integrity protection and ciphering. Moreover, SRB2 is typically configured after security activation has occurred. RRC connectivity also addresses the availability of data radio bearers ("DRBs"). While SRBs are used to transfer RRC signaling messages, DRBs carry User Plane content over the air interface. Depending on the services used by a UE, a number of DRBs can be established.

The security procedures for RRC messaging may depend on the type of RRC messaging being used between the UE and eNB. For example, narrow band internet of things ("NB-IoT") is a Rel-13 feature supporting two alternative ways of transporting data. NB-IoT is optimized for small infrequent data from a very large number of devices. When data is transported over the U-plane, the RRC connection can be suspended to be resumed at a later time to reduce signaling due to state transitions. As another example, if a radio link failure or handover failure occurs between the UE and eNB, the UE may initiate a RRC connection re-establishment procedure to re-establish the SRB1 operation and reactivate the security algorithms used by the UE and eNB.

A number of technical issues arise when a UE and eNB exchange RRC messaging.

SUMMARY

To address the foregoing problems, disclosed is a method in a wireless device for radio resource control ("RRC") connectivity. In one embodiment, a method in a wireless device for radio resource control connectivity includes transmitting a RRC connection request message to a network node, wherein the RRC connection request message is part of a first RRC connection protocol. The method may also include receiving a responsive message from the network node, wherein the response message is part of the first RRC connection protocol. In some embodiments, the response message includes an indication that the wireless device should suppress a RRC connection complete message in response to receiving the responsive message. The method may further include determining that the RRC connection complete message that is part of the first RRC connection protocol should not be transmitted to the network node and suppressing the transmittal of the RRC connection complete message to the network node.

In certain embodiments, after suppressing the transmittal of the RRC connection complete message, the method may further include receiving a RRC connection reconfiguration message from the network node and transmitting a RRC connection reconfiguration complete message to the network node.

In certain embodiments, the RRC connection request message is a RRC Connection Reestablishment Request message, the responsive message is a RRC connection reestablishment message, and the suppressing RRC connection complete message is a RRC connection reestablishment complete message.

In certain embodiments, after suppressing the transmittal of the RRC connection complete message, the method may also include transmitting a second RRC connection request message to the network node, wherein the second RRC connection request message is part of a second RRC connection protocol. The method may then include receiving a second responsive message from the network node, wherein the second responsive message is part of the second RRC connection protocol and transmitting a second RRC connection complete message to the network node, wherein the RRC connection complete message is part of the second RRC connection protocol.

Also disclosed is a wireless device. The wireless device includes a power source, an interface and processing circuitry communicatively coupled to the interface. The power source may provide power to the interface and processing circuitry. The interface may be configured to transmit a RRC connection request message to a network node, the RRC connection request message is part of a first RRC connection protocol. The interface may further be configured to receive a responsive message from the network node, the response message is part of the first RRC connection protocol. The response message may include an indication that the wireless device should suppress a RRC connection complete message in response to receiving the responsive message. The processing circuitry may be configured to determine that the RRC connection complete message should not be communicated in reply to receiving the responsive message.

In certain embodiments, the interface of the wireless device is further configured to receive a RRC connection reconfiguration message from the network node and transmit a RRC connection reconfiguration complete message to the network node.

In certain embodiments, the RRC connection request message is a RRC Connection Reestablishment Request message, the responsive message is a RRC Connection Reestablishment message, and the suppressed RRC connection complete message is a RRC Connection Reestablishment Complete message.

In certain embodiments, after the processing circuitry determines that the RRC connection complete message should not be communicated, the interface may further be configured to transmit a second RRC connection request message to the network node, wherein the second RRC connection request message is part of a second RRC connection protocol. The interface may further receive a second responsive message from the network node, wherein the second responsive message is part of the second RRC connection protocol and transmit a second RRC connection complete message to the network node, wherein the RRC connection complete message is part of the second RRC connection protocol.

Also disclosed is a method performed by a network node for RRC connectivity. The method may include receiving a first RRC connection request message from a wireless device, the RRC connection request message is part of a first RRC connection protocol. The method may also include determining that a second RRC connection protocol will be communicated in response to the first RRC connection protocol and transmitting a responsive message to the wireless device, wherein the responsive message is part of the first RRC connection protocol. In some embodiments, the response message includes an indication that the wireless device should suppress a RRC connection complete message in response to receiving the responsive message.

In certain embodiments, the second RRC connection protocol is a RRC reconfiguration protocol, and the method further includes transmitting a RRC connection reconfiguration message to the wireless device and receiving a RRC connection reconfiguration complete message from the wireless device.

In certain embodiments, the RRC connection request message is a RRC connection reestablishment request message, the responsive message is a RRC connection reestablishment message, and the suppressed RRC connection complete message is a RRC connection reestablishment complete message.

In certain embodiments, upon receiving the RRC connection reconfiguration complete message, the method further includes determining that the wireless device completed the first RRC connection protocol and determining that the wireless device successfully completed the RRC connection reconfiguration procedure.

Also disclosed is a network node. The network node comprises processing circuitry and an interface communicatively coupled to the processing circuitry. The interface may be configured to receive a first RRC connection request message from a wireless device, the RRC connection request message is part of a first RRC connection protocol. The processing circuitry may be configured to determine that a second RRC connection protocol will be communicated in response to the first RRC connection protocol. The interface may be further configured to transmit a responsive message to the wireless device, wherein the responsive message is part of the first RRC connection protocol. In some embodiments, the response message includes an indication that the wireless device should suppress a RRC connection complete message in response to receiving the responsive message.

In certain embodiments, second RRC connection protocol is a RRC reconfiguration protocol and the interface is further configured to transmit a RRC connection reconfiguration message to the wireless device and receive a RRC connection reconfiguration complete message from the wireless device.

In certain embodiments, the RRC connection request message is a RRC connection reestablishment request message, the responsive message is a RRC connection reestablishment message, and the suppressed RRC connection complete message is a RRC connection reestablishment complete message.

In certain embodiments, upon receiving the RRC connection reconfiguration complete message, the processing circuitry is further configured to determine that the wireless device completed the first RRC connection protocol and determine that the wireless device successfully completed the RRC connection reconfiguration procedure.

Certain embodiments of the present disclosure may provide one or more technical advantages. For example, certain embodiments may advantageously allow for the mitigation of additional overhead due to additional RRC signaling. As another example, certain embodiments may advantageously conserve resources by limiting the number of RRC connection messages transmitted between the eNB and UE. Other advantages may be readily apparent to one having skill in the art. Certain embodiments may have none, some, or all of the recited advantages.

BRIEF DESCRIPTION OF THE DRAWINGS

For a more complete understanding of the present disclosure, reference is now made to the following description, taken in conjunction with the accompanying drawings, in which.

DETAILED DESCRIPTION

As described above, there are a number of technical issues associated with RRC connectivity between a UE and an eNB. Specifically, there may be situations that require multiple RRC connection messages to be communicated between an eNB and a UE. The signaling for a given RRC connection protocol typically ends with a "complete" message communicated from the UE to the eNB. Since there is no optimization between the eNB and UE when sending multiple RRC connection messages, each of the RRC connection messages has its own complete message. However, requiring each RRC connection message to include a complete message may create unnecessary overhead. An issue therefore exists regarding unnecessary signaling between a UE and an eNB during RRC connectivity.

To improve signaling efficiency, embodiments of the present disclosure allow for the suppression of one or more RRC connection complete messages. As an illustrative embodiment, in certain embodiments a UE and eNB may communicate a RRC reestablishment message followed by a RRC reconfiguration message. In some embodiments, the RRC reestablishment message protocol includes: (1) the UE transmitting a RRCConnectionReestablishmentRequest message to the eNB; (2) the eNB transmitting a RRCConnectionReestablishment message back to the UE; and (3) the UE communicating a RRCConnectionReestablishmentComplete message back to the UE. Subsequently, the RRC connection may then be modified by a RRC connection reconfiguration. The RRC connection reconfiguration message protocol may include: (1) the eNB communicating a RRCConnectionReconfiguration message to the UE; and (2) the UE communicating a RRCConnectionReconfigurationComplete message back to the eNB.

To improve signaling efficiency between the eNB and UE, it may be beneficial to omit/suppress one or more of the complete messages sent by the UE. For example, since the eNB knows that the RRC connection reconfiguration message will follow the RRC reestablishment message protocol, the eNB may indicate to the UE that the UE should suppress the RRCConnectionReestablishmentComplete message. The eNB may include an indication in the RRCConnectionReestablishment message that the UE should suppress the ensuing RRCConnectionReestablishmentComplete message. The eNB may then communicate the RRCConnectionReconfiguration message to the UE and the UE may communicate a RRCConnectionReconfigurationComplete message back to the eNB;

Suppressing/omitting the intermediary complete message thereby improves the uplink ("UL") signaling efficiency using an unconventional signaling protocol. Moreover, suppressing certain complete messages may advantageously conserve resources by limiting the number of RRC connection messages transmitted between the eNB and UE. The foregoing is merely an illustrative example. FIGS. 1-7 provide additional details for optimizing RRC connectivity that may provide these and other advantages.

Figure 1:
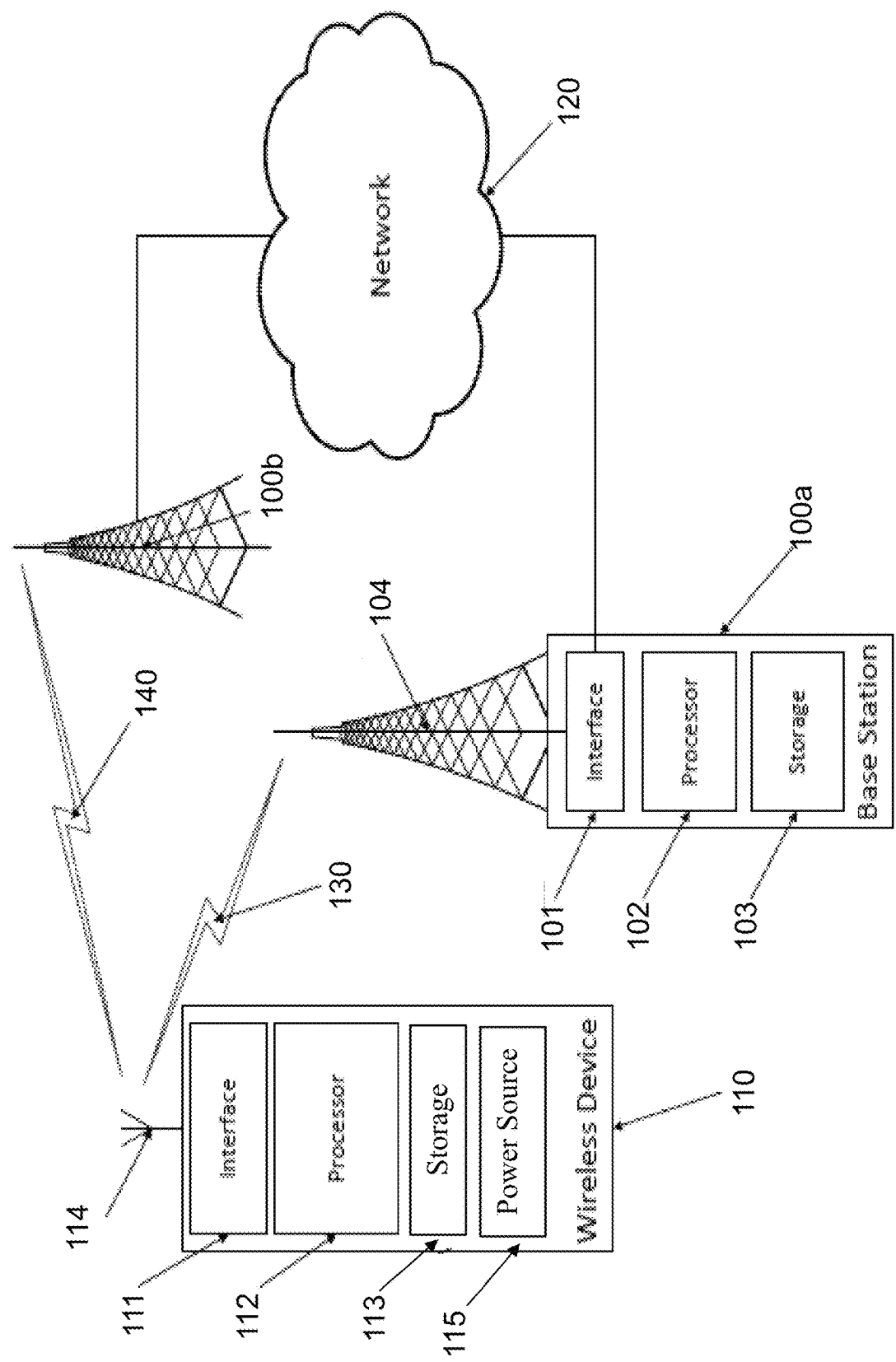
FIG. 1 is a schematic diagram of a wireless communication network, in accordance with certain embodiments.

FIG. 1 is a schematic diagram of a wireless communication network 100, in accordance with certain embodiments. In the illustrated embodiment, FIG. 1 includes network 120, network nodes 100a-b (network node 100a may be referenced generally as "network node 100"), and wireless device 110. Network node 100 may be interchangeably referred to as eNodeB (eNB) 100. Wireless device 110 may be interchangeably referred to as user equipment (UE) 110. In different embodiments, the wireless network may comprise any number of wired or wireless networks, network nodes, base stations (BS), controllers, wireless devices, relay stations, and/or any other components that may facilitate or participate in the communication of data and/or signals whether via wired or wireless connections.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 100 may refer to any kind of network node 100, which may comprise a Node B, base station (BS), radio base station, multi-standard radio (MSR) radio node such as MSR BS, eNode B, network controller, radio network controller (RNC), multi-cell/multicast coordination entity (MCE), base station controller (BSC), relay node, base transceiver station (BTS), access point (AP), radio access point, transmission points, transmission nodes, remote radio unit (RRU), remote radio head (RRH), nodes in distributed antenna system (DAS), core network node (e.g., MSC, MME, SON node, coordinating node, etc.), O&M, OSS, positioning node (e.g., E-SMLC), MDT, an external node (e.g., third-party node, a node external to the current network), or any suitable network node.

Network node 100 comprises interface 101, processor 102, storage 103, and antenna 104. These components are depicted as single boxes located within a single larger box. In practice, however, a network node 100 may comprise multiple different physical components that make up a single illustrated component (e.g., interface 101 may comprise terminals for coupling wires for a wired connection and a radio transceiver for a wireless connection). As another example, network node 100 may be a virtual network node in which multiple different physically separate components interact to provide the functionality of network node 100 (e.g., processor 102 may comprise three separate processors located in three separate enclosures, where each processor is responsible for a different function for a particular instance of network node 100). Similarly, network node 100 may be composed of multiple physically separate components (e.g., a NodeB component and a RNC component, a BTS component and a BSC component, etc.), which may each have their own respective processor, storage, and interface components. In certain scenarios in which network node 100 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 100 may be configured to support multiple radio access technologies (RATs). In such embodiments, some components may be duplicated (e.g., separate storage 103 for the different RATs) and some components may be reused (e.g., the same antenna 104 may be shared by the RATs).

Processor 102 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in conjunction with other network node 100 components, such as storage 103, network node 100 functionality. For example, processor 102 may execute instructions stored in storage 103. Such functionality may include providing various wireless features discussed herein to a wireless devices, such as wireless device 110, including any of the features or benefits disclosed herein.

Storage 103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 103 may store any suitable instructions, data or information, including software and encoded logic, utilized by network node 100. Storage 103 may be used to store any calculations made by processor 102 and/or any data received via interface 101.

Network node 100 also comprises interface 101, which may be used in the wired or wireless communication of signalling and/or data between network node 100, network 120, and/or wireless device 110. For example, interface 101 may perform any formatting, coding, or translating that may be needed to allow network node 100 to send and receive data from network 120 over a wired connection. Interface 101 may also include a radio transmitter and/or receiver that may be coupled to or a part of antenna 104. The radio may receive digital data that is to be sent out to other network nodes or wireless devices 110 via a wireless connection. The radio may convert the digital data into a radio signal having the appropriate channel and bandwidth parameters. The radio signal may then be transmitted via antenna 104 to the appropriate recipient (e.g., wireless device 110).

Antenna 104 may be any type of antenna capable of transmitting and receiving data and/or signals wirelessly. In some embodiments, antenna 104 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 110 may be any type of wireless endpoint, mobile station, mobile phone, wireless local loop phone, smartphone, user equipment (UE), desktop computer, PDA, cell phone, tablet, laptop, VoIP phone or handset, which is able to wirelessly send and receive data and/or signals to and from a network node, such as network node 100 and/or other wireless devices 110. For example, wireless device 110 may transmit wireless signals to one or more of network nodes 100a-b, and/or receive wireless signals from one or more of network nodes 100a-b. The wireless signals may contain voice traffic, data traffic, control signals, and/or any other suitable information. In some embodiments, an area of wireless signal coverage associated with a network node 100 may be referred to as a cell. In some embodiments, wireless device 110 may have device-to-device (D2D) capability. Thus, wireless device 110 may be able to receive signals from and/or transmit signals directly to another wireless device.

Wireless device 110 comprises interface 111, processor 112, storage 113, antenna 114, and power source 115. Like network node 100, the components of wireless device 110 are depicted as single boxes located within a single larger box, however in practice a wireless device may comprises multiple different physical components that make up a single illustrated component (e.g., storage 113 may comprise multiple discrete microchips, each microchip representing a portion of the total storage capacity).

Interface 111 may be used in the wireless communication of signalling and/or data between wireless device 110 and network node 100. For example, interface 111 may perform any formatting, coding, or translating that may be needed to allow wireless device 110 to send and receive data from network node 100 over a wireless connection. Interface 111 may also include a radio transmitter and/or receiver that may be coupled to or a part of antenna 114. The radio may receive digital data that is to be sent out to network node 100 via a wireless connection. The radio may convert the digital data into a radio signal having the appropriate channel and bandwidth parameters. The radio signal may then be transmitted via antenna 114 to network node 100.

Processor 112 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in combination with other wireless device 110 components, such as storage 113, wireless device 110 functionality. Such functionality may include providing various wireless features discussed herein, including any of the features or benefits disclosed herein.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by wireless device 110. Storage 113 may be used to store any calculations made by processor 112 and/or any data received via interface 111.

Antenna 114 may be any type of antenna capable of transmitting and receiving data and/or signals wirelessly. In some embodiments, antenna 114 may comprise one or more omni-directional, sector or panel antennas operable to transmit/receive radio signals between 2 GHz and 66 GHz. For simplicity, antenna 114 may be considered a part of interface 111 to the extent that a wireless signal is being used.

Power source 115 may comprise power management circuitry. Power source 115 may receive power from a power supply, which may either be comprised in, or be external to, power source 115. For example, wireless device 110 may comprise a power supply in the form of a battery or battery pack which is connected to, or integrated in, power source 115. Other types of power sources, such as photovoltaic devices, may also be used. As a further example, wireless device 110 may be connectable to an external power supply (such as an electricity outlet) via an input circuitry or interface such as an electrical cable, whereby the external power supply supplies power to power source 115. Power source 115 may be electrically coupled to interface 111, processor 112, storage 113, and be configured to supply wireless device 110 with power for performing the functionality described herein.

Figure 5:
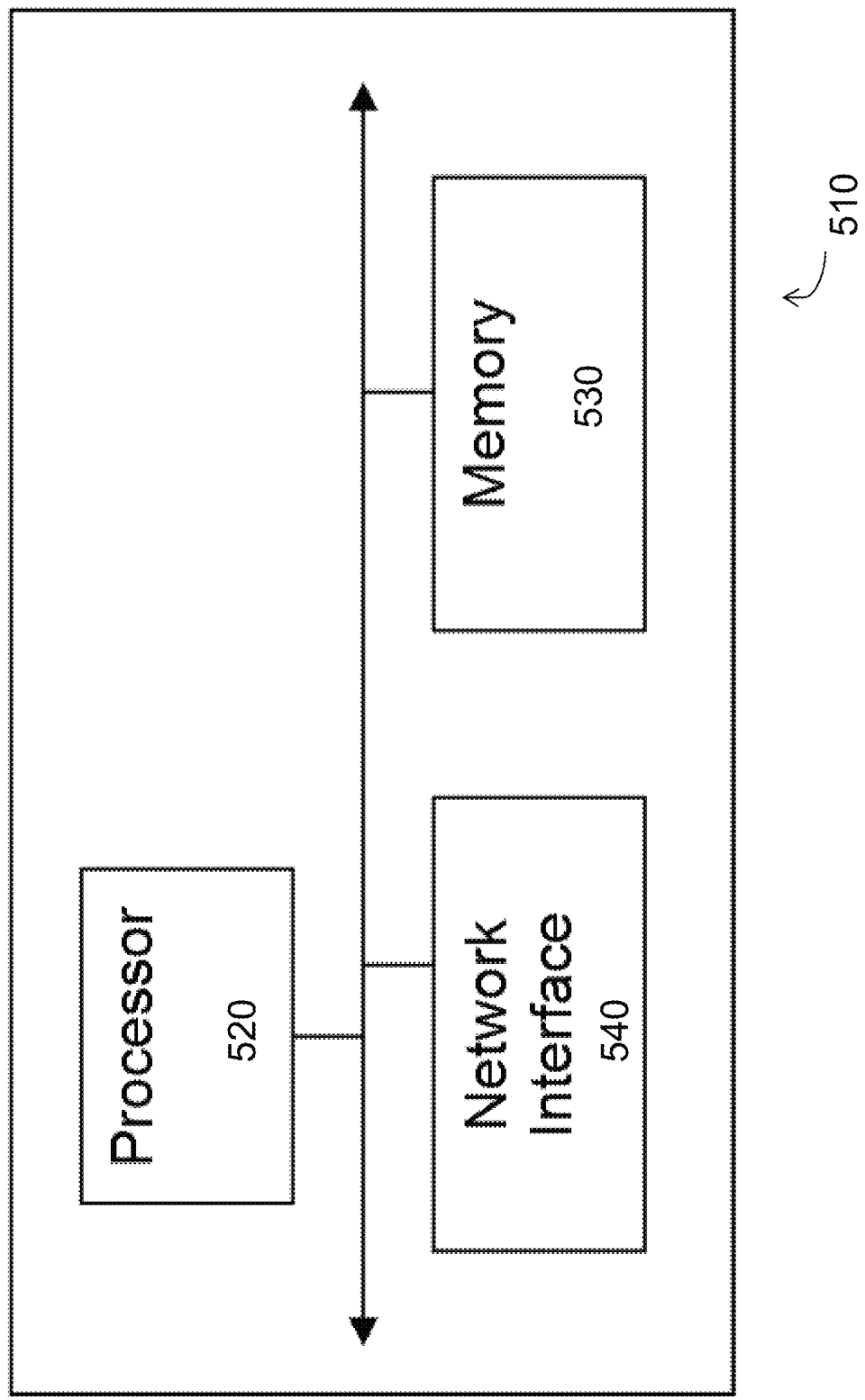
FIG. 5 is a schematic block diagram of an exemplary radio network controller or core network node, in accordance with certain embodiments.

In certain embodiments, network nodes 100 may interface with a radio network controller. The radio network controller may control network nodes 100 and may provide certain radio resource management functions, mobility management functions, and/or other suitable functions. In certain embodiments, the functions of the radio network controller may be performed by network node 100. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a PSTN, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. FIG. 5 describes additional functionality of a radio network controller.

In some embodiments, the core network node may manage the establishment of communication sessions and various other functionalities for wireless device 110. Wireless device 110 may exchange certain signals with the core network node using the non-access stratum (NAS) layer. In NAS signaling, signals between wireless devices 110 and the core network node may be transparently passed through the radio access network. In certain embodiments, network nodes 100 may interface with one or more network nodes over an internode interface. For example, network nodes 100a and 100b may interface over an X2 interface.

Although FIG. 1 illustrates a particular arrangement of a wireless network, the present disclosure contemplates that the various embodiments described herein may be applied to a variety of networks having any suitable configuration. For example, the wireless network may include any suitable number of wireless devices 110 and network nodes 100, as well as any additional elements suitable to support communication between wireless devices or between a wireless device and another communication device (such as a landline telephone). Furthermore, although certain embodiments may be described as implemented in a long-term evolution (LTE) network, the embodiments may be implemented in any appropriate type of telecommunication system supporting any suitable communication standards and using any suitable components, and are applicable to any RAT or multi-RAT systems in which the wireless device receives and/or transmits signals (e.g., data). For example, the various embodiments described herein may be applicable to NR, LTE, LTE-Advanced, UMTS, HSPA, GSM, cdma2000, WiMax, WiFi, or any another suitable radio access technology.

As described above, the present disclosure contemplates various embodiments that provide solutions for optimizing RRC connectivity between network node 100 and wireless device 110. For example, in some embodiments, network node 100 may determine that a second RRC connection messaging protocol will follow a first RRC connection messaging protocol. Because network node 100 knows that the second RRC connection reconfiguration message will follow the prior RRC connection message, network node 100 may suppress the RRC connection complete message that is part of the first RRC connection protocol and rely on the second, subsequent RRC connection complete message that is part of the second connection protocol to ensure that the first and second RRC connection messaging protocols were properly executed. Suppressing an intermediate RRC connection complete message may allow network node 100 to mitigate additional messaging overhead due to multiple complete messages being sent in the UL.

In some embodiments, wireless device 110 may initiate an RRC connection reestablishment protocol. For example, wireless device 110 may detect a radio link failure. To reestablish the RRC connection with the network node 100, wireless device 110 may implement the RRC connection protocol associated with RRC connection reestablishment. Accordingly, wireless device 110 may transmit a RRC connection request message to network node 100 in the form of a RRCConnectionReestablishmentRequest message. Upon receiving the RRCConnectionReestablishmentRequest message, network node 100 may determine that a RRC connection reconfiguration protocol will be transmitted subsequent to the RRC connection reestablishment protocol. Accordingly, in some embodiments, network node 100 may determine that wireless device 110 should not transmit a RRC connection reestablishment complete message as part of the RRC connection reestablishment protocol. Thus, after wireless device 110 transmits the RRCConnectionReestablishmentRequest message, wireless device 110 may receive the RRCConnectionReestablishment message from network node 100. Network node 100 may also indicate to wireless device 110 that wireless device 110 should suppress the RRC connection complete message that is part of the RRC connection protocol associated with RRC connection reestablishment (e.g., RRCConnectionReestablishmentComplete).

The indication to suppress the RRC connection complete message may be communicated in any suitable manner. For example, in some embodiments, the indication may be communicated to wireless device 110 as part of the RRC message sent in response to the RRC connection request. If the first RRC connection message protocol is a RRC connection reestablishment protocol, the indication may be communicated from network node 100 to wireless device 110 as part of the RRCConnectionReestablishment message. In some embodiments, the indication may be communicated in a same or subsequent transmission, transport block, or MAC PDU.

Upon receiving the indication, wireless device 110 may determine that a RRC connection complete message is not required and suppress transmitting the RRC connection complete message that is part of the first RRC connection protocol. Using the above example, wireless device 110 may suppress the transmission of the RRCConnectionReestablishmentComplete message in response to receiving the RRCConnectionReestablishment message.

In some embodiments, network node 100 may then transmit a RRC connection reconfiguration message to wireless device 110 (e.g., RRCConnectionReconfiguration). Upon successful reconfiguration, wireless device 110 may then communicate a RRC connection complete message to network node 100 in accordance with the RRC connection reconfiguration protocol by sending a RRCConnectionReconfigurationComplete message. If the RRC connection reconfiguration fails, wireless device 110 may communicate a different message, for example, wireless device 110 may initiate a new RRC connection reestablishment protocol. In this manner, network node 100 and wireless device 110 may optimize the RRC connectivity and remove the need for extra RRC connection complete messages.

Any appropriate steps, methods, or functions may be performed through a computer program product that may, for example, be executed by the components and equipment illustrated in the figure above. For example, storage 103 may comprise non-transitory computer readable means on which a computer program can be stored. The computer program may include instructions, which cause processor 102 (and any operatively coupled entities and devices, such as interface 101 and storage 103) to execute methods according to embodiments described herein. The computer program and/or computer program product may thus provide means for performing any steps herein disclosed.

While the foregoing embodiments were described in the context of RRC re-establishment and reconfiguration messaging, embodiments of the present disclosure may be extended to any RRC messaging wherein multiple RRC connection messages are communicated between the UE and eNB, thereby allowing the eNB to indicate that the UE may suppress/omit one or more complete messages that are associated with a RRC connection message.

Figure 2:
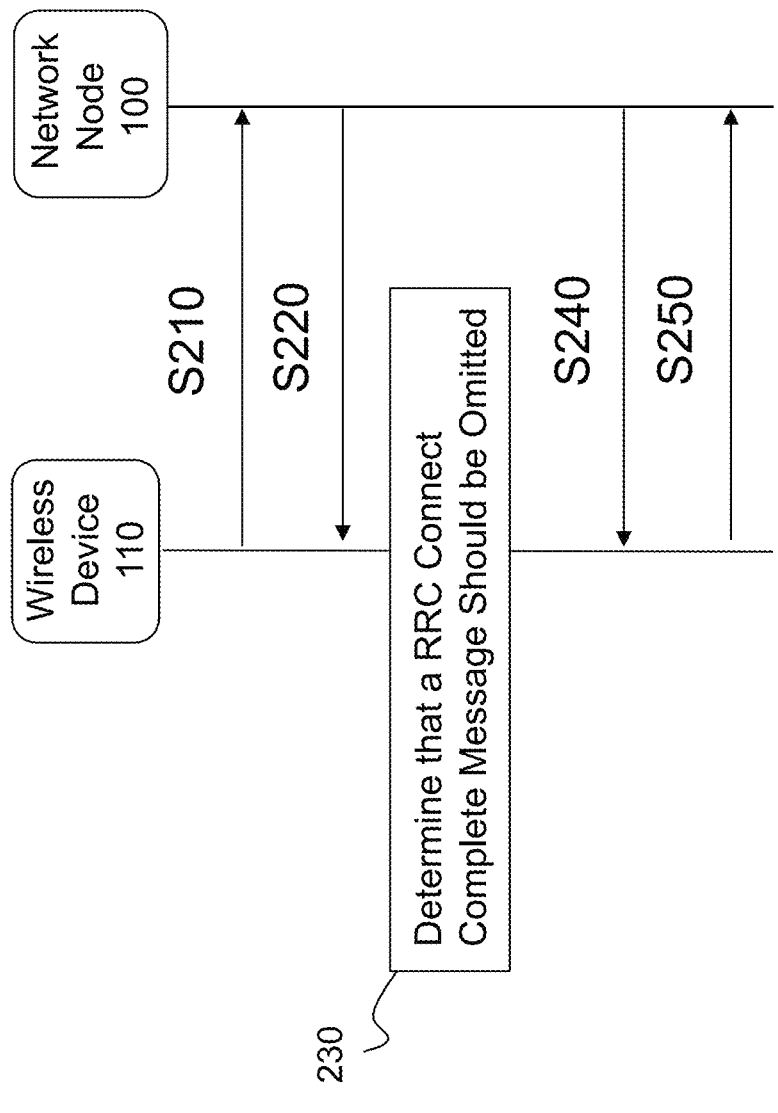
FIG. 2 illustrates a signal flow diagram for optimizing RRC connectivity, in accordance with certain embodiments.
Figure 3:
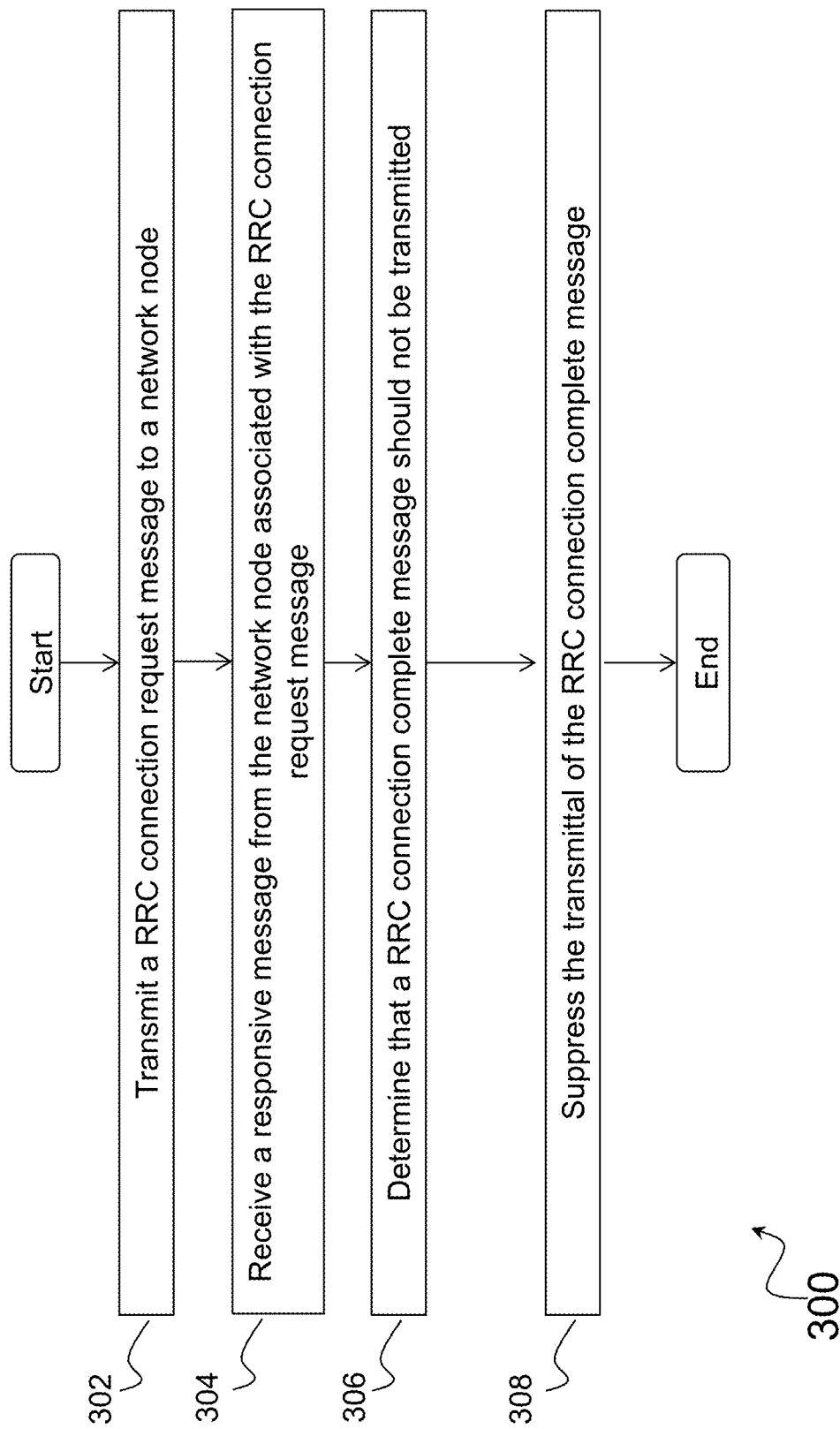
FIG. 3 is a flow chart of a method in a wireless device, in accordance with certain embodiments.
Figure 4:
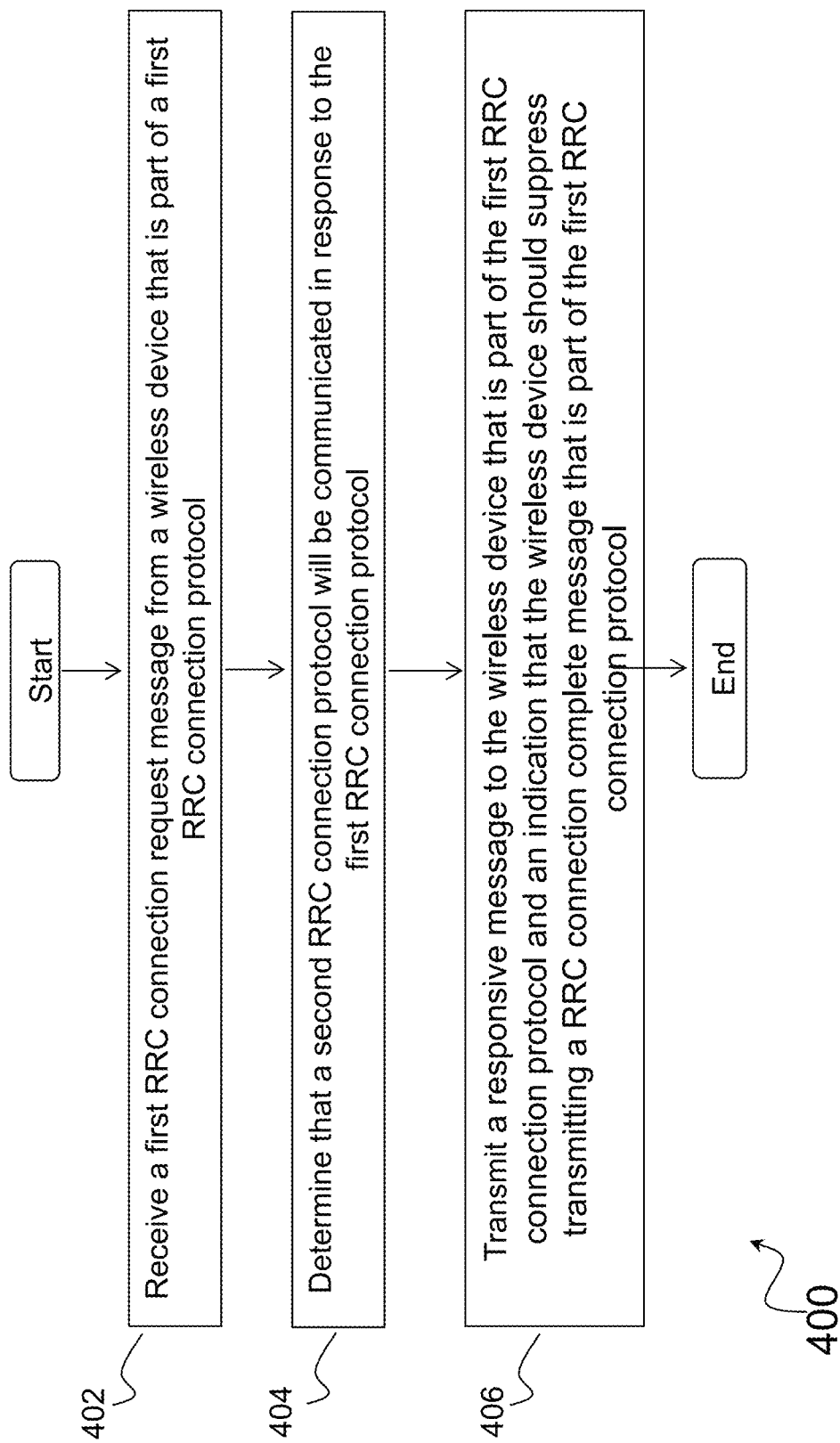
FIG. 4 is a flow chart of a method in a network node, in accordance with certain embodiments.

Moreover, the timing of the RRC connection messaging is merely illustrative. For example, in certain embodiments, network node 100 may transmit a RRC connection reconfiguration message shortly after transmitting a response to wireless device 110's initial RRC connection request message. In some embodiments, network node 100 may even multiplex the reconfiguration message and the response message in the same transport block. Using the above example to illustrate, network node 100 may transmit the RRCConnectionReconfiguration message shortly after transmitting the RRCConnectionReestablishment message. Thus, in some embodiments wireless device 110 may actually determine that the RRCConnectionReestablishment- Complete message should be suppressed after receiving the RRCConnectionReconfiguration message. In some embodiments, network node 100 may delay sending the RRC reconfiguration message to allow wireless device 110 time to suppress the RRC connection reestablishment complete message before receiving the RRC reconfiguration message. FIGS. 2-4 provide additional embodiments of the present disclosure to describe the optimization of RRC connectivity between wireless device 110 and network nodes 100a-b.

FIG. 2 illustrates a signal flow diagram 200 for optimizing RRC connectivity, in accordance with certain embodiments. Signal flow diagram 200 describes an example connection control procedure that allows for a reduction in the number of transmitted RRC connection complete messages, thereby minimizing overhead.

In the illustrated embodiment, wireless device 110 transmits RRC connection request message S210 to network node 100. RRC connection request message S210 may be part of a first RRC connection protocol. A RRC connection protocol may refer to the messaging associated with a RRC connection procedure. For example, for a RRC connection establishment, the signaling may include a RRC connection request message from wireless device 110 to network node 100; a RRC connection setup message from network node 100 to wireless device 110; and a RRC connection setup complete message from wireless device 110 to network node 100. Similarly, a RRC connection reestablishment messaging protocol may include a RRC connection reestablishment request message from wireless device 110 to network node 100; a RRC reestablishment message from network node 100 to wireless device 110; and a RRC connection reestablishment complete message from wireless device 110 to network node 100. Accordingly, in FIG. 2 RRC connection request message S210 may be any suitable RRC connection message, including but not limited to an establishment request message, a resume request message, and a re-establishment request message. Accordingly, the technical benefits realized by the present disclosure may apply to any suitable communication protocol that involves wireless device 110 communicating a complete or acknowledgement message to network node 100.

As further illustrated, network node 100 transmits a responsive message S220 to wireless device 110. Response message S220 may also be part of the first RRC connection protocol. For example, responsive message S220 may be any suitable RRC connection message, including a connection setup message or a connection reestablishment message. For example, if RRC connection request message S210 is a RRC connection reestablishment request message, then response message S220 may be a RRC connection reestablishment message. As another example, if RRC connection request message S210 is a RRC connection resume request message then response message S220 may be a RRC connection resume message or RRC connection setup message.

Upon receiving RRC connection request message S210, network node 100 may recognize that a second RRC connection protocol will follow the first RRC connection protocol. For example, in some embodiments a RRC connection reconfiguration protocol may follow a RRC connection reestablishment protocol. When network node 100 receives a RRC connection reestablishment request message as RRC connection request message S210, network node 100 may determine that one or more intermediate RRC connection complete messages may be suppressed. Accordingly, network node 100 may communicate an indication to wireless device 110 that wireless device 110 may suppress communicating a subsequent RRC connection complete message that would otherwise typically be transmitted as part of the first RRC connection protocol.

In some embodiments, the indication to suppress a subsequent RRC connection complete message may be communicated as part of response message 220. In some embodiments, the indication to suppress a subsequent RRC connection complete message may be communicated using a separate communication. Thus, because network node 100 knows when a second RRC connection protocol will follow the first RRC connection protocol, network node 100 can indicate to wireless device 110 in the same or in a subsequent transmission/transport block/MAC PDU, that wireless device 110 shall not send a RRC connection complete message.

Upon receiving response message 220, at step 230, wireless device 110 may determine that a RRC connect complete message should be suppressed from the typical first RRC connection protocol. This determination may be made based on reception of the indication communicated by network node 100. For example, if response message S220 is a RRC connection reestablishment message, wireless device 110 may typically communicate a RRC connection reestablishment complete message back to network node 100. Network node 100 may include an indication as part of response message 220 that wireless device 110 should suppress/omit the subsequent RRC connection reestablishment complete message. Accordingly, wireless device 110 may determine not to send a RRC connection complete message.

As shown in FIG. 2, network node 100 may follow the first RRC connection protocol with a second RRC connection protocol. Consequently, after communicating response message S220, network node 100 may transmit an opening message S240 that is part of the second RRC connection protocol. For example, in some embodiments, the second RRC connection protocol may be a RRC reconfiguration protocol. When the second RRC connection protocol is a RRC connection reconfiguration protocol, network node 100 may communicate a RRC connection reconfiguration message as opening message S240.

After receiving opening message S240 of the second RRC connection protocol, wireless device 110 may respond with a reply message S250. Thus, when the second RRC connection protocol is a RRC connection reconfiguration protocol, wireless device 110 may communicate a RRC connection reconfiguration complete message as reply message S250. In this manner, although two RRC connection protocols are communicated between network node 100 and wireless device 110, only one complete message is communicated. By suppressing/omitting at least one of the RRC connection complete messages typically associated with one or more of the RRC connection protocols, UL signaling efficiency may be improved.

Although FIG. 2 is illustrated as having network node 100 communicate the first message of the second RRC connection protocol, in some embodiments wireless device 110 may communicate the first message of the second RRC connection protocol. Thus, in some embodiments, after determining that a RRC connect complete message should be suppressed/omitted at step 230, wireless device 110 may transmit a second RRC connection request message to network node 100. The second RRC connection request message may be part of the second RRC connection protocol. In response to receiving the second RRC connection request message, network node 100 may communicate a second response message that is part of the second RRC connection protocol. In response, wireless device 110 may transmit a RRC connection complete message that is part of the second RRC connection protocol to network node 100. In this manner, wireless device 110 and network node 100 may reduce the number of communicated RRC connection complete messages.

Based on the forgoing descriptions of FIG. 2, the present disclosure contemplates a number of embodiments for optimizing RRC connectivity. FIGS. 3 and 4 provide additional detail on methods for optimizing RRC connectivity.

FIG. 3 is a flow chart of a method 300 in a wireless device 110, in accordance with certain embodiments. In some embodiments, method 300 may be performed by wireless device 110 for optimizing RRC connectivity. At step 302, wireless device 110 may transmit a RRC connection request message to network node 100. The RRC connection request message may be part of a first RRC connection protocol. For example, the first RRC connection protocol may be a RRC connection reestablishment protocol and the RRC connection request message may be a RRC connection reestablishment request message.

At step 304, wireless device 110 may receive a responsive message from network node 100. The response message may be part of the first RRC connection protocol. For example, if wireless device 110 communicates a RRC connection reestablishment request message at step 302, then wireless device 110 may receive a RRC connection reestablishment message at step 304. In some embodiments, the response message includes an indication that wireless device 110 should suppress a RRC connection complete message that is conventionally part of the first RRC connection protocol.

At step 306, wireless device 110 determines whether to suppress the RRC connection complete message and not transmit the connection complete message to network node 100. If wireless device 110 determines that the RRC connection complete message should not be transmitted, at step 308, wireless device 110 may suppress the transmittal of the RRC connection complete message to network node 100. For example, if the first RRC connection protocol is a RRC connection reestablishment protocol, then wireless device 110 may determine that it should suppress a RRC connection reestablishment complete message.

FIG. 4 is a flow chart of a method 400 in a network node 100, in accordance with certain embodiments. In some embodiments, method 400 may be performed by network node 100 to optimize RRC connectivity. At step 402, network node 100 may receive a first RRC connection request message from wireless device 110. The RRC connection request message may be part of a first RRC connection protocol. At step 404, network node 100 may determine that a second RRC connection protocol will be communicated in response to the first RRC connection protocol. For example, in some embodiments, the first communication protocol may be a RRC connection reestablishment protocol and the second communication protocol may be a RRC connection reconfiguration protocol.

At step 406, network node 100 may transmit a responsive message to wireless device 110, wherein the responsive message is part of the first RRC connection protocol. In some embodiments, the response message may include an indication that wireless device 110 should suppress a RRC connection complete message that is part of the first RRC connection protocol in response to receiving the responsive message. For example, if the first communication protocol is a RRC connection reestablishment protocol, wireless device 110 may receive the indication and suppress the transmission of a RRC connection reestablishment complete message.

Any steps described herein in regards to FIGS. 3 and 4 are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

FIG. 5 is a schematic block diagram of an exemplary radio network controller or core network node 510, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 510 includes processor 520, memory 530, and network interface 540. In some embodiments, processor 520 executes instructions to provide some or all of the functionality described above as being provided by the network node, memory 530 stores the instructions executed by processor 520, and network interface 540 communicates signals to any suitable node, such as a gateway, switch, router, Internet, Public Switched Telephone Network (PSTN), network nodes 100, radio network controllers or core network nodes 510, etc.

Processor 520 may include any suitable combination of hardware and software implemented in one or more modules to execute instructions and manipulate data to perform some or all of the described functions of the radio network controller or core network node 510. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for the network node, send output from the network node, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of the network node may include additional components beyond those shown in FIG. 5 that may be responsible for providing certain aspects of the network node's functionality, including any of the functionality described above and/or any additional functionality (including any functionality necessary to support the embodiments described above).

Figure 6:
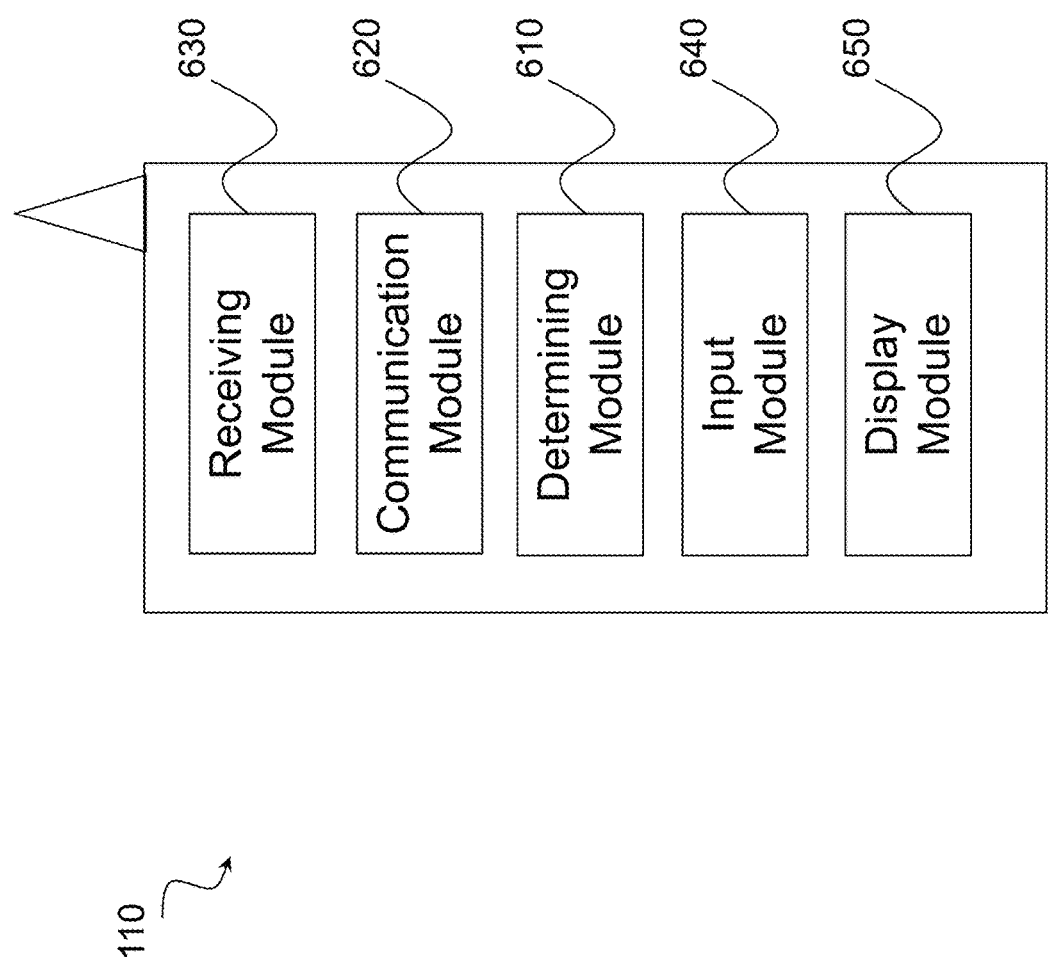
FIG. 6 is a schematic block diagram of an exemplary wireless device, in accordance with certain embodiments.

FIG. 6 is a schematic block diagram of an exemplary wireless device 110, in accordance with certain embodiments. Wireless device 110 may include one or more modules. For example, wireless device 110 may include a determining module 610, a communication module 620, and a receiving module 630. Optionally, wireless device 110 may include an input module 640, a display module 650, and any other suitable modules. Wireless device 110 may perform one or more steps for optimizing RRC connectivity described above with respect to FIGS. 1-4.

Determining module 610 may perform the processing functions of wireless device 110. In certain embodiments, wireless device 110 may perform any of the functions described above with respect to FIGS. 1-4. In one example embodiment, determining module 610 may determine that, based on an indication received from network node 100, an RRC connection complete message that is typically part of a RRC connection protocol should not be transmitted to network node 100. Determining module 610 may then suppress the transmittal of the RRC connection complete message to network node 100.

Determining module 610 may include or be included in one or more processors, such as processor 112 described above in relation to FIG. 1. Determining module 610 may include analog and/or digital circuitry configured to perform any of the functions of determining module 610 and/or processor 112 described above. The functions of determining module 610 described above may, in certain embodiments, be performed in one or more distinct modules.

Communication module 620 may perform the communication functions of wireless device 110. In certain embodiments, communication module 620 may perform any of the communication functions described above with respect to FIGS. 1-4. In some embodiments, communication module 620 may transmit RRC connection messages to network node 100. For example, in some embodiments, wireless device 110 may initiate a RRC connection reestablishment protocol. As part of that protocol, communication module 620 may communicate an RRC connection reestablishment request message to network node 100. Communication module 620 may also transmit RRC connection messages that are responsive to messages received from network node 100. For example, communication module may transmit RRC connection complete messages. As another example, communication module 620 may transmit signals S210 and S250 as disclosed in FIG. 2.

Communication module 620 may transmit messages to one or more network nodes 100a-b of the wireless network described in FIG. 1. Communication module 620 may include a transmitter and/or a transceiver, such as interface 111 and/or antenna 114 described above in relation to FIG. 1. Communication module 620 may include circuitry configured to wirelessly transmit messages and/or signals. In particular embodiments, communication module 620 may receive messages and/or signals for transmission from determining module 610. In certain embodiments, the functions of communication module 620 described above may be performed in one or more distinct modules.

Receiving module 630 may perform the receiving functions of wireless device 110. In certain embodiments, receiving module 630 may perform any of the receiving functions of wireless device 110 described above with respect to FIGS. 1-4. In one example embodiment, receiving module 630 may receive RRC connection messages from network node 100. For instance, wireless device 110 may initiate a RRC connection reestablishment protocol. As part of that protocol, communication module 620 may transmit an RRC connection reestablishment request message to network node 100. In return, receiving module 630 may receive a RRC connection reestablishment message from network node 100. As another example, receiving module 630 may receive signals S220 and S240 as disclosed in FIG. 2.

Receiving module 630 may include a receiver and/or a transceiver, such as interface 111 and/or antenna 114 described above in relation to FIG. 1. Receiving module 630 may include circuitry configured to wirelessly receive messages and/or signals. In particular embodiments, receiving module 630 may communicate received messages and/or signals to determining module 610.

Optionally, wireless device 110 may include input module 640. Input module 640 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 610.

Optionally, wireless device 110 may include display module 650. Display module 650 may present signals on a display of wireless device 110. Display module 650 may include the display and/or any appropriate circuitry and hardware configured to present signals on the display. Display module 650 may receive signals to present on the display from determining module 610.

Determining module 610, communication module 620, receiving module 630, input module 640, and display module 650 may include any suitable configuration of hardware and/or software. Wireless device 110 may include additional modules beyond those shown in FIG. 7 that may be responsible for providing any suitable functionality, including any of the functionality described above and/or any additional functionality (including any functionality necessary to support the various solutions described herein).

Figure 7:
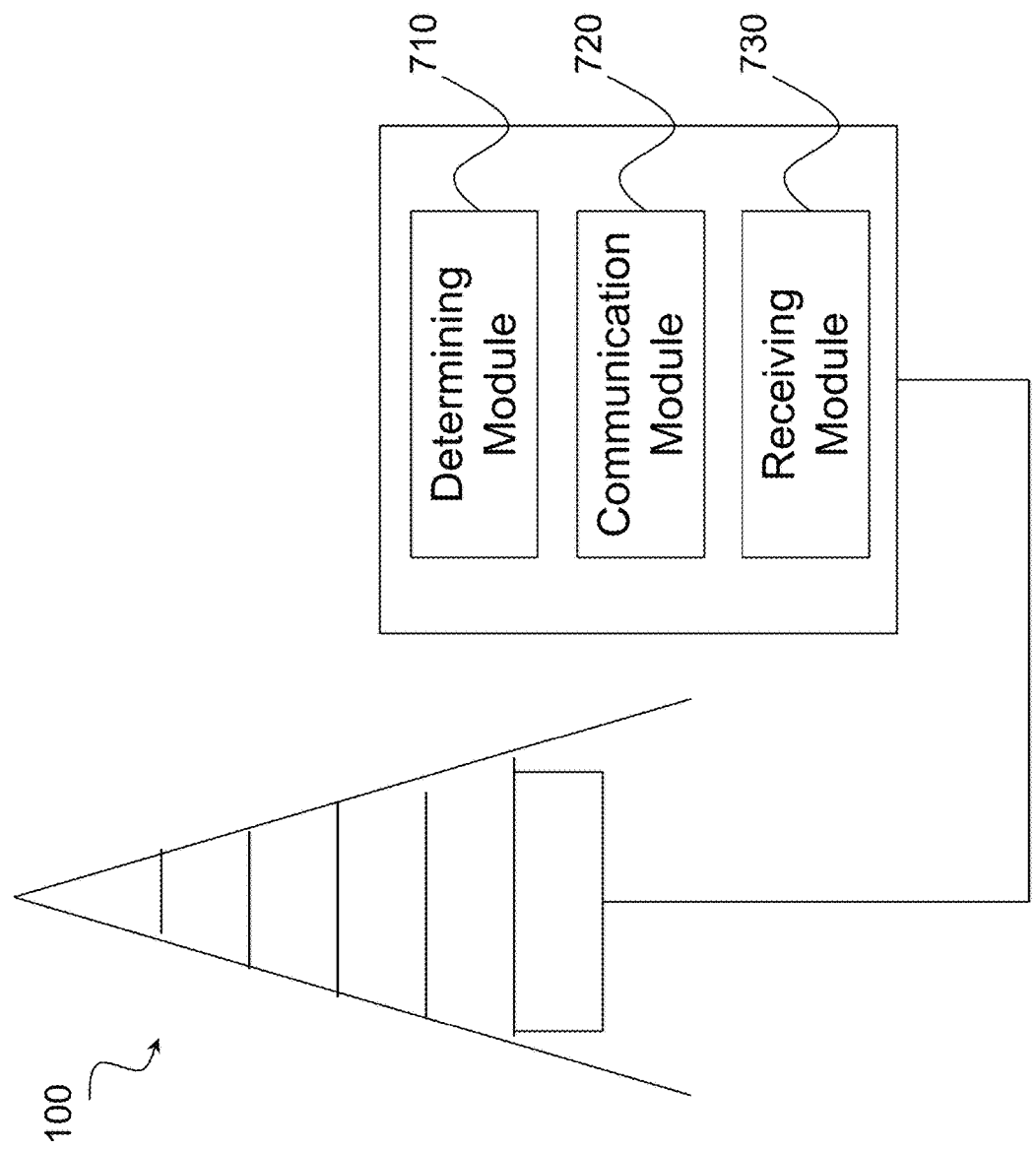
FIG. 7 is a schematic block diagram of an exemplary network node, in accordance with certain embodiments.

FIG. 7 is a block schematic of an exemplary network node 100, in accordance with certain embodiments. Network node 100 may include one or more modules. For example, network node 100 may include determining module 710, communication module 720, receiving module 730, and any other suitable modules. In some embodiments, one or more of determining module 710, communication module 720, receiving module 730, or any other suitable module may be implemented using one or more processors, such as processor 102 described above in relation to FIG. 1. In certain embodiments, the functions of two or more of the various modules may be combined into a single module. Network node 100 may perform one or more steps of the secure RRC connectivity embodiments described above in reference to FIGS. 1-4.

Determining module 710 may perform the processing functions of network node 100. In certain embodiments, determining module 710 may perform any of the functions of network node 100 described above with respect to FIGS. 1-4. In one example embodiment, determining module 710 may determine that a second RRC connection protocol will be communicated in response to receiving a RRC connection message that is part of a first RRC connection protocol. For example, upon receiving an RRC connection request message from wireless device 110, network node 100 may recognize that a second RRC connection protocol will follow the first RRC connection protocol. To illustrate, in some cases a RRC connection reconfiguration protocol may follow a RRC connection reestablishment protocol. When network node 100 receives a RRC connection reestablishment request message from wireless device 110, determining module 710 may determine that one or more intermediate RRC connection complete messages may be suppressed based on the ensuing RRC connection messages. Determining module 710 may further determine that network node 100 should communicate an indication to wireless device 110 that wireless device 110 should suppress/omit the transmittal of a RRC connection complete message as part of the first RRC connection protocol.

Determining module 710 may include or be included in one or more processors, such as processor 102 described above in relation to FIG. 1. Determining module 710 may include analog and/or digital circuitry configured to perform any of the functions of determining module 710 and/or processor 102 described above. The functions of determining module 710 may, in certain embodiments, be performed in one or more distinct modules. For example, in certain embodiments some of the functionality of determining module 710 may be performed by an allocation module.

Communication module 720 may perform the transmission functions of network node 100. In certain embodiments, network node 100 may perform any of the functions of network node 100 described above with respect to FIGS. 1-4. In one example embodiment, communication module 720 may transmit a responsive message to wireless device 110 in response to receiving a RRC connection message. The response message may be part of a first RRC connection protocol. For example, responsive message may be any suitable RRC connection message, including a connection setup message and a connection re-establishment message. Thus, if wireless device 110 transmits a RRC connection reestablishment request message, then response message may be a RRC connection reestablishment message.

Upon receiving RRC connection request message, network node 100 may recognize that a second RRC connection protocol will follow the first RRC connection protocol. For example, in some cases a RRC connection reconfiguration protocol may follow a RRC connection reestablishment protocol. When network node 100 receives a RRC connection reestablishment request message, determining module 710 may determine that one or more intermediate RRC connection complete messages that are part of the first RRC connection protocol may be suppressed. Accordingly, communication module 720 may communicate an indication to wireless device 110 that wireless device 110 may suppress communicating a subsequent RRC connection complete message that would otherwise typically be transmitted as part of the first RRC connection protocol. In some embodiments, communication module 720 may transmit other RRC connection messages such as a RRC connection reconfiguration message. As another example, communication module 720 may transmit signals S220 and S240 as disclosed in FIG. 2.

Communication module 720 may transmit messages to one or more of wireless devices 110. Communication module 720 may include a transmitter and/or an antenna, such as antenna 104 described above in relation to FIG. 1. Communication module 720 may include circuitry configured to wirelessly transmit messages and/or signals. In particular embodiments, communication module 720 may receive messages and/or signals for transmission from determining module 710 or any other module.

Receiving module 730 may perform the receiving functions of network node 100. In certain embodiments, receiving module 730 may perform any of the functions of network node 100 described in FIGS. 1-4. In one example embodiment, receiving module 730 may receive RRC connection messages from wireless device 110, including an establishment request message, a resume request message, and a re-establishment request message. Receiving module 730 may receive addition messages that are part of RRC communication protocols such as RRC connection complete messages. As another example, receiving module 730 may receive may signals S210 and S250 as disclosed in FIG. 2.

Receiving module 730 may receive any suitable information from wireless device 110 Receiving module 730 may include a receiver and/or a transceiver, such as interface 101 and/or antenna 104, which are described above in relation to FIG. 1. Receiving module 730 may include circuitry configured to wirelessly receive messages and/or signals. In particular embodiments, receiving module 730 may communicate received messages and/or signals to determining module 710 or any other suitable module.

Determining module 710, communication module 720, and receiving module 730 may include any suitable configuration of hardware and/or software. Network node 100 may include additional modules beyond those shown in FIG. 7 that may be responsible for providing any suitable functionality, including any of the functionality described above and/or any additional functionality (including any functionality necessary to support the various embodiments described herein).

Modifications, additions, or omissions may be made to the systems and apparatuses disclosed herein without departing from the scope of the disclosure. Although the above description and embodiments refer to communications that are part of one or more RRC connection protocols, embodiments of the present disclosure may be extended to other types of communications and protocols exchanged between wireless device 110 and network node 100.

Moreover, the components of the systems and apparatuses may be integrated or separated. The operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 102 and/or 112, possibly in cooperation with storage 103 and/or 113. Processors 102 and/or 112 and storage 103 and/or 113 may thus be arranged to allow processors 102 and/or 112 to fetch instructions from storage 103 and/or 113 and execute the fetched instructions to allow the respective functional module to perform any steps or functions disclosed herein.

Modifications, additions, or omissions may be made to the methods disclosed herein without departing from the scope of the disclosure. The methods may include more, fewer, or other steps. Additionally, steps may be performed in any suitable order. Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AP Access Point
BS Base Station
BSC Base Station Controller BTS Base Transceiver Station
CCCH Common Control Channel
D2D Device-to-device
DAS Distributed Antenna System
DCCH Dedicated Control Channel
DRB Data Radio Bearer
eNB evolved Node B
LAN Local Area Network
LTE Long Term Evolution
MAC Medium Access Control
MAN Metropolitan Area Network
MCE Multi-cell/multicast Coordination Entity
MSR Multi-standard Radio
NAS Non-Access Stratum
NB-IoT Narrow Band Internet of Things
NDI New Data Indicator
PDCCH Physical Downlink Control Channel
PSTN Public Switched Telephone Network
RNC Radio Network Controller
RRC Radio Resource Control
SRB Signaling Radio Bearer
UE User Equipment
UL Uplink
WAN Wide Area Network

The invention claimed is:

1. A method in a wireless device for radio resource control (RRC) connectivity, the method comprising:
    transmitting a RRC connection request message to a network node, the RRC connection request message is part of a first RRC connection protocol;
    transmitting a second RRC connection request message to the network node, wherein the second RRC connection request message is part of a second RRC connection protocol;
    receiving a responsive message from the network node, the response message is part of the first RRC connection protocol;
    receiving an indication that the wireless device should suppress a RRC connection complete message that is part of the first RRC connection protocol;
    determining that the RRC connection complete message should not be transmitted to the network node with respect to the first RRC connection protocol;
    suppressing the transmittal of the RRC connection complete message to the network node with respect to the first RRC connection protocol; and
    transmitting a second RRC connection complete message to the network node wherein the second RRC connection complete message is part of the second RRC connection protocol, the second RRC connection complete message indicating that signaling for both the first RRC connection protocol and the second RRC connection protocol is complete.

2. The method of claim 1, wherein after suppressing the transmittal of the RRC connection complete message, the method further comprises:
    receiving a RRC connection reconfiguration message from the network node;
    transmitting a RRC connection reconfiguration complete message to the network node.

3. The method of claim 1, wherein the RRC connection request message is a RRC Connection Reestablishment Request message, the responsive message is a RRC connection reestablishment message, and the suppressed RRC connection complete message is a RRC connection reestablishment complete message.

4. The method of claim 1, wherein the indication that the wireless device suppresses the RRC connection complete message is part of the responsive message from the network node.

5. The method of claim 1, wherein after suppressing the transmittal of the RRC connection complete message, the method further comprises:
    receiving a second responsive message from the network node, wherein the second responsive message is part of the second RRC connection protocol.

6. A wireless device for radio resource control ("RRC") connectivity, comprising:
    a power source configured to provide power to an interface and processing circuitry;
    the interface configured to:
        transmit a RRC connection request message to a network node, the RRC connection request message is part of a first RRC connection protocol;
        transmit a second RRC connection request message to the network node, wherein the second RRC connection request message is part of a second RRC connection protocol;
        receive a responsive message from the network node, the response message is part of the first RRC connection protocol;
        receive an indication that the wireless device should suppress a RRC connection complete message that is part of the first RRC connection protocol; and
    the processing circuitry communicatively coupled to the interface, the processing circuitry configured to:
        determine that the RRC connection complete message should not be transmitted to the network node with respect to the first RRC connection protocol;
        suppress the transmittal of the RRC connection complete message to the network node with respect to the first RRC connection protocol; and
    wherein the interface is further configured to transmit a second RRC connection complete message to the network node wherein the second RRC connection complete message is part of the second RRC connection protocol, the second RRC connection complete message indicating that signaling for both the first RRC connection protocol and the second RRC connection protocol is complete.

7. The wireless device of claim 6, wherein the interface is further configured to:
    receive a RRC connection reconfiguration message from the network node; and
    transmit a RRC connection reconfiguration complete message to the network node.

8. The wireless device of claim 6, wherein the RRC connection request message is a RRC Connection Reestablishment Request message, the responsive message is a RRC connection reestablishment message, and the suppressed RRC connection complete message is a RRC Connection reestablishment complete message.

9. The wireless device of claim 6, wherein the indication that the wireless device should suppress the RRC connection complete message is part of the responsive message.

10. The wireless device of claim 6, wherein after the processing circuitry determines that the RRC connection complete message is suppressed, the interface is further configured to:
    receive a second responsive message from the network node, wherein the second responsive message is part of the second RRC connection protocol.

11. A method performed by a network node for radio resource control (RRC) connectivity, the method comprising:
- receiving a first RRC connection request message from a wireless device, the RRC connection request message is part of a first RRC connection protocol;
- receiving a second RRC connection request message from the wireless device, wherein the second RRC connection request message is part of a second RRC connection protocol;
- determining that a second RRC connection protocol will be communicated in response to the first RRC connection protocol and that a RRC connection complete message can be suppressed with respect to the first RRC connection protocol;
- transmitting a responsive message to the wireless device, wherein the responsive message is part of the first RRC connection protocol;
- transmitting an indication to the wireless device that the wireless device should suppress the RRC connection complete message that is part of the first RRC connection protocol; and
- receiving a second RRC connection complete message from the wireless device wherein the second RRC connection complete message is part of the second RRC connection protocol, the second RRC connection complete message indicating that signaling for both the first RRC connection protocol and the second RRC connection protocol is complete.

12. The method of claim 11, wherein the second RRC connection protocol is a RRC reconfiguration protocol, the method further comprising:
- transmitting a RRC connection reconfiguration message to the wireless device;
- receiving a RRC connection reconfiguration complete message from the wireless device.

13. The method of claim 11, wherein the RRC connection request message is a RRC connection reestablishment request message, the responsive message is a RRC connection reestablishment message, and the suppressed RRC connection complete message is a RRC connection reestablishment complete message.

14. The method of claim 12, wherein upon receiving the RRC connection reconfiguration complete message, the method further comprises:
- determining that the wireless device completed the first RRC connection protocol; and
- determining that the wireless device completed the RRC connection reconfiguration protocol.

15. The method of claim 11, wherein the indication that the wireless device should suppress the RRC connection complete message is part of the responsive message.

16. A network node, comprising:
- an interface configured to:
  - receive a first radio resource control ("RRC") connection request message from a wireless device, the RRC connection request message is part of a first RRC connection protocol; and
  - receive a second RRC connection request message from the wireless device, wherein the second RRC connection request message is part of a second RRC connection protocol;
- processing circuitry communicatively coupled to the interface, the processing circuitry configured to determine that a second RRC connection protocol will be communicated in response to the first RRC connection protocol and that a RRC connection complete message can be suppressed with respect to the first RRC connection protocol; and
- the interface further configured to:
  - transmit a responsive message to the wireless device, wherein the responsive message is part of the first RRC connection protocol;
  - transmit an indication to the wireless device that the wireless device should suppress the RRC connection complete message that is part of the first RRC connection protocol in response to receiving the responsive message; and
  - receive a second RRC connection complete message from the wireless device wherein the second RRC connection complete message is part of the second RRC connection protocol, the second RRC connection complete message indicating that signaling for both the first RRC connection protocol and the second RRC connection protocol is complete.

17. The network node of claim 16, wherein the second RRC connection protocol is a RRC reconfiguration protocol, the interface is further configured to:
- transmit a RRC connection reconfiguration message to the wireless device; and
- receive a RRC connection reconfiguration complete message from the wireless device.

18. The network node of claim 16, wherein the RRC connection request message is a RRC connection reestablishment request message, the responsive message is a RRC connection reestablishment message, and the suppressed RRC connection complete message is a RRC connection reestablishment complete message.

19. The network node of claim 17, wherein upon receiving the RRC connection reconfiguration complete message, the processing circuitry is further configured to:
- determine that the wireless device completed the first RRC connection protocol; and
- determine that the wireless device completed the RRC connection reconfiguration protocol.

* * * * *